Feb. 15, 1949.   W. LOVING   2,462,026
MANUFACTURE OF CARBON BLACK

Original Filed Jan. 8, 1943   3 Sheets-Sheet 1

Feb. 15, 1949.  W. LOVING  2,462,026

MANUFACTURE OF CARBON BLACK

Original Filed Jan. 8, 1943  3 Sheets-Sheet 2

Inventor:
William Loving
By Kenway & Witter
Attorneys

Patented Feb. 15, 1949

2,462,026

UNITED STATES PATENT OFFICE 2,462,026

MANUFACTURE OF CARBON BLACK

William Loving, Pampa, Tex., assignor to Godfrey L. Cabot, Inc., Boston, Mass., a corporation of Massachusetts Original application January 8, 1943, Serial No. 471,685. Divided and this application April 30, 1946, Serial No. 666,036

3 Claims. (Cl. 23—209.8)

This invention relates to the production of carbon black and consists in a novel process for producing a high yield of furnace or soft black from a carbon-carrying gas, which process is adapted also by convenient control and adjustment of operating conditions to produce blacks having a wide range of different characteristics and properties.

The present application is a division of my earlier application Ser. No. 471,685, filed January 8, 1943, now patent No. 2,418,475 dated April 8, 1947, in which is disclosed and claimed a new and improved furnace useful in carrying out the process of my invention.

Soft black has been produced heretofore in furnaces of the general type disclosed in U. S. Reissue Letters Patent No. 16,765, Matlock, wherein natural gas and air have been supplied in regulated volumes to and burned in an enclosure of substantial capacity. Carbon black is formed by the incomplete combustion of natural gas in such enclosure and the unconsumed particles suspended in the products of combustion are then captured, separated and collected without being permitted to impinge or deposit upon adjacent hot or cold surfaces of the furnace or its connection. This process is therefore to be distinguished from the "thermatomic" process, on the one hand, where the carbon black is formed by passing the gas through heated checker-work, and from the impingement process, on the other hand, where the carbon black is deposited by direct impingement of the flame against relatively cool surfaces.

The process of my invention is characterized by the employment of a large enclosed and unrestricted combustion space which, in operation, is filled with a formless turbulent swirling body of flame without form or method, except that it tends to progress toward an outlet duct at the rear end of the furnace enclosure.

As herein shown the furnace enclosure is elongated horizontally being provided in its rear end with a duct, through which the products of combustion and suspended carbon black are drawn off for separation, and in its front wall with a series of burner boxes through which air and gas are admitted to the enclosure. I have found that it is advantageous in several respects to inject natural gas at higher velocity into a body of air as it enters the enclosure divided into several parallel sheets, preferably employing a multiplicity of small, well distributed gas inlet orifices and so breaking up the combustible air-gas mixture that there is no trace of laminar flow therein.

I have also found that favorable conditions for high quality and yield of carbon black are realized when an immediate turbulence is created in the area in which the gas first enters the air.

The burner boxes herein shown are designed to produce gas distribution and turbulent combustion of the type described. Each burner box is designed as a complete self-contained unit of size convenient to be individually assembled and then incorporated in its place in the front wall of the furnace but outside the furnace enclosure or chamber. As herein shown each box comprises a rectangular metal casing, flanged for connection with the furnace and having a series of parallel burner pipes closely spaced within its open or flanged end. The individual burner pipes may be three feet or more in length and provided with rows of gas outlet orifices. Each burner pipe is arranged to be supplied with a regulated amount of natural gas by any convenient connections. Air is supplied to the burner box at its outer wall by valve-controlled connections, is passed through a perforated baffle located behind the burner pipes, and thence passes forwardly into the furnace through the substantially uniform spaces provided for that purpose between the parallel burner pipes.

In one aspect my novel process consists in the steps of flowing a large body of air smoothly in a horizontal direction through an opening of fixed area where it is separated into parallel streams, injecting a multiplicity of jets of gas at high velocity and directed in the same general direction into the air streams in locations distributed in a definite pattern coextensive with substantially the area of the said opening thereby establishing immediate and localized turbulence conditions of incomplete combustion, and subsequently collecting the unburned carbon particles.

In order to secure good air distribution, it has been found advantageous to employ burner pipes of oval or pear shaped or other elongated cross section. In such a construction a spacing of about 1½" between the rows of inlet orifices in two adjacent burner pipes, or a spacing of about ¼" between the thickest point of the adjacent burner pipes has been found very satisfactory in operation. If in such a furnace air is supplied at a ratio of 5:1 as compared to the supply of gas, the initial velocity of the gas into the combustion space will be over twice that of the air. Gas velocities of from 2 to 4 times the air velocity can be used advantageously in making various commercially valuable grades of furnace black.

The process of my invention has been found to be very advantageous from the standpoint of yield. In addition to this, it is extremely versatile in the range of product obtainable. By proper adjustment of gas and air it will produce carbon black having a range of rubber reinforcing properties and color corresponding to the darkest channel rubber blacks up to that of the grayest medium thermal blacks.

These and other characteristics of the novel process of my invention will be best understood and appreciated from the following description of a preferred manner of putting it into practice illustrated in the accompanying drawings, in which.

Figure 1:
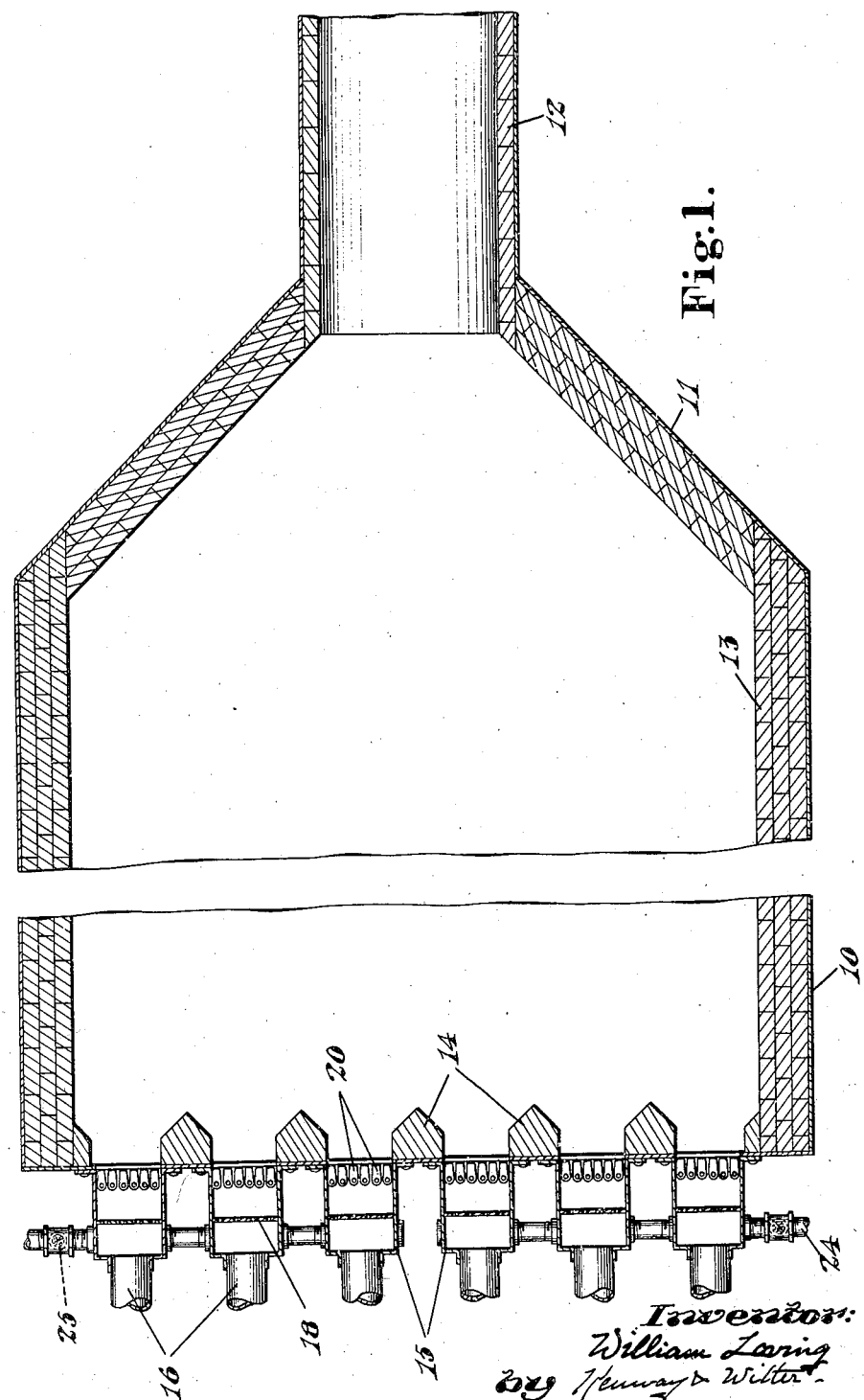
Fig. 1 is a view of a complete furnace in horizontal cross section.

The rectangular body 10 of the furnace merges rearwardly into a converging section 11 and that, in turn, communicates at its rear end with a cylindrical outlet duct 12. The walls of the furnace are enclosed in a sheet steel casing and lined with refractory brick 13 and the outlet duct is also lined with a thinner layer of refractory brick. The front wall of the furnace is made up of alternate piers of refractory brick 14 and burner boxes 15 which are bolted in place between the piers to the casing of the rear wall of the furnace. In the illustrated furnace six burner boxes are shown, but the number thereof may be varied within the scope of the invention to include more or less than therein shown. It will be understood that the entire interior of the furnace comprises a free unobstructed combustion space which, for example, may be approximately 20 ft. long, 12 ft. wide and 3½ ft. high.

Figure 2:
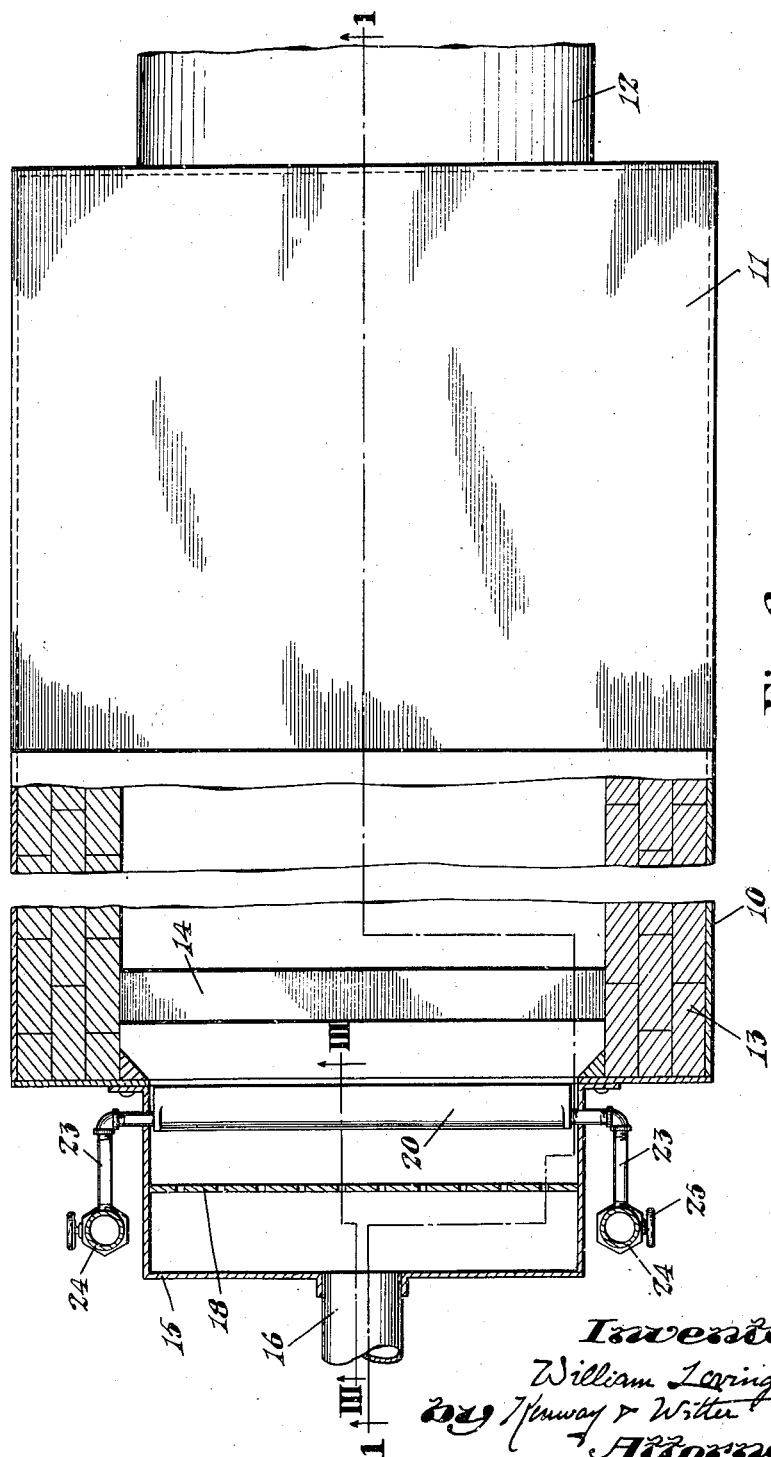
Fig. 2 is a corresponding view on a somewhat larger scale showing the furnace partly in side elevation and partly in vertical section.
Figure 3:
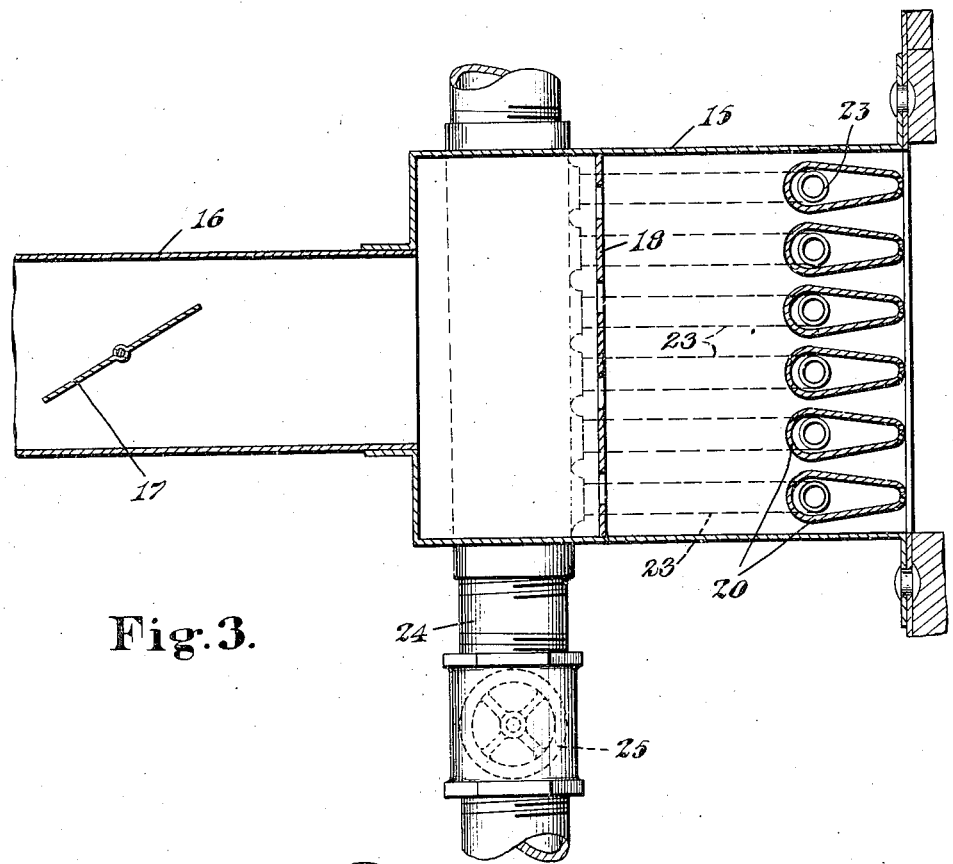
Fig. 3 is a view of one of the burner boxes in horizontal cross section on an enlarged scale.

The construction of the individual burner boxes is best shown in Figs. 2 and 3. Each of these boxes comprises a rectangular casing of sheet metal, open at its front or furnace side and flanged so that it may be riveted or otherwise secured to the front wall of the furnace casing. The outer wall of each box is also apertured and flanged for the reception of an air inlet duct 16 which is herein shown as provided with an air valve 17 for regulating the amount of air supplied to its particular burner box. Within the casing is provided a vertical diaphragm or baffle plate 18 which divides the box into two compartments and is perforated so as to distribute uniformly to the burner pipes air admitted through the duct 16 to the space in the outer or rear end of the box. After passing the baffle plate 18 the air flows in a straight path in reaching the burner pipes.

The burner pipes 20 are preferably hollow integral castings, and may be substantially three feet long and oval or pear-shaped in cross section as best shown in Fig. 3. This cross section is advantageous in that it provides maximum gas capacity in burner pipes arranged with a spacing affording the requisite air passage area of most favorable shape. The pipes are herein shown as arranged vertically in parallel relation just within the open side of the casing 15 with their narrow end walls directed forwardly toward the furnace and their wider end walls directed rearwardly toward the diaphragm 18. The burner pipes are arranged with a definite and uniform predetermined spacing affording air passages of calculated dimensions between them. These individual passages converge abruptly to the line of maximum width of the burner pipes and then diverge more gradually toward the narrow perforated outlet walls of the pipes which are thus all located in a common plane transverse to the length of the furnace. In the pipes herein shown the line of maximum width is located about one-quarter of the distances from the wide rear wall of the burner pipe to its narrow front wall. In practice satisfactory results are secured by arranging the burner pipes with a spacing of approximately ¼" between their thickest portions.

Figure 4:
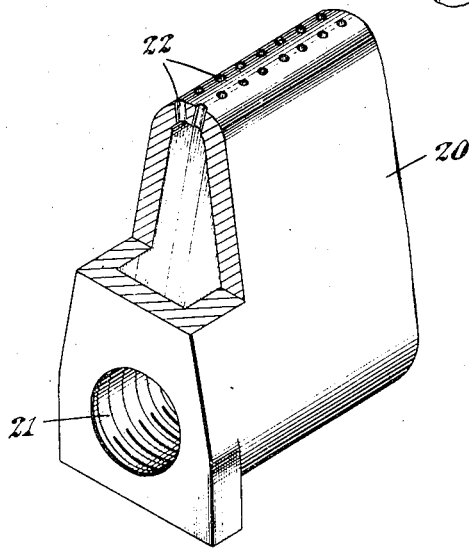
Fig. 4 is a fragmentary view in perspective of one of the burner pipes.

The burner pipes are provided in their opposite flat end walls with tapped holes 21 for gas connections. These holes are disposed concentrically with respect to the wider curved wall of the pipes. In the narrow front wall of each burner pipe are drilled gas orifices or burner holes 22 as best shown in Fig. 4. These orifices may be parallel or disposed at any desired angle, but are herein shown as diverging forwardly and outwardly at an angle of approximately 20° to each other. The orifices may be of $\frac{5}{32}$" diameter, arranged with approximately ¼" to ½" spacing and when two rows are provided as herein shown each burner pipe may thus have 280 orifices. The multiplicity of small orifices and the greater velocity at which the gas enters the slower moving body of air has been found in practice to insure immediate and general turbulence in the air-gas mixture adjacent to the burner pipes and throughout the combustion space, and thus bring about an exceptionally complete mixing of the gas and air, eliminating all trace of laminar flow or of definite flame surfaces persisting in form for any detectable length of time. The gas is, in effect, injected from burner pipes located outside the furnace in the form of jets travelling in the same general direction and at higher velocity into a large body of air and from a multiplicity of small circular burner holes well distributed over the face of the furnace chamber, all the jets being initiated substantially in a common transverse plane. The continuity of the body of air is broken up by the multiplicity of jets establishing turbulence therein which in some cases may extend even slightly behind the burner pipes, that is, on the diaphragm side of the pipes.

Gas is supplied simultaneously to both ends of each burner pipe by pipe connections 23 which are shown as leading from gas headers 24, one arranged above and one below the row of burner boxes and both provided with regulating valves 25 by which the amount of gas delivered to the pipes may be regulated.

With the burner pipes arranged as shown and spaced 1.91 inches between their centers, and with two rows of $\frac{5}{32}$" gas orifices on ¼" centers along each pipe, the total gas inlet area in one lineal inch of the burner pipe amounts to .1534 sq. in. The gas from the jets in this lineal inch of burner pipe issues into a mass of air having a cross sectional area of 1.91 sq. in. less the area of the jets which is .1534, or 1.7566 sq. in. Consequently, if the volume of air used is five times the volume of the gas, the velocity of the gas in the jets is 2.3 times that of the surrounding air.

It has been found that a high ratio of perimeter to area of gas inlet orifice is advantageous in the furnace of my invention. Employing orifices of the dimensions above set forth results in a ratio of perimeter to area of 25.6:1 expressed in inches. In all cases I operate with a ratio of cross-sectional perimeter to cross-sectional area of above 10 to 1. If desired the orifices may be equipped with the lava tips well known to the industry, but in any case it is desirable to locate the burner bars themselves outside the combustion space of the furnace where they are not subjected directly to the intense heat of the flaming gas mixture.

It will be noted that the burner pipes herein shown are elongated in cross-section, approximately four times their greatest width and that the gas orifices in each pipe are located in its narrower wall which is directed toward the furnace enclosure. It is, of course, desirable to secure gas jets of substantially equal volume for injection into the volume of enclosed air at a substantially uniform and higher velocity. It has been found that by elongating the gas pipes in cross section at least three times their width, these desirable results are achieved. In referring to the gas orifices as being of small diameter, I mean that their diameter is in the order of $\frac{3}{32}$ inch and not over $\frac{1}{2}$ inch.

In carrying out the process of my invention with the assistance of the apparatus herein described, and as best indicated in Fig. 3, the air is directed by the duct 16 and diaphragm 18 from behind the burner pipes 20, forwardly into the furnace in a substantially straight horizontal path passing in streams or sheets of approximately equal volume through the spaces provided for it between the burner pipes. The streamline contour of the burner pipes insures smooth, non-turbulent flow of the body of air and separates it into parallel streams. However, as the air reaches the transverse plane of the front walls of the burner pipes 20, a multiplicity of small well-distributed gas jets is injected at relatively high velocity into the body of the air, and thus there is set up an immediate and localized turbulence of the air-gas mixture. Incomplete combustion of the mixture begins in this zone of turbulence with the formation of carbon black by decomposition of the unburned gas, as the swirling body of flame progresses toward the outlet duct 12.

Having thus disclosed my invention and described specifically the most satisfactory manner of practicing it now known to me, I claim as new and desire to secure by Letters Patent:

1. The process of making furnace carbon black, which includes the steps of admitting a relatively large body of air, divided into several separate parallel sheets of air, into an elongated unrestricted combustion space, injecting into the combustion space a multiplicity of small jets of carbon-containing gas arranged in rows between adjacent air sheets, flowing the jets of gas in the same general direction as the air sheets and passing directly and in a well distributed manner into the air at such higher velocity than that of the air as to establish an immediate and localized turbulent mixture of air and gas about the jets under conditions of incomplete combustion, thereby decomposing the unconsumed gas while in free space, and collecting the unburned carbon particles from the products of combustion.

2. The process defined in claim 1, further characterized by the fact that the gas is injected at a velocity of at least twice that of the air.

3. The process defined in claim 1, further characterized by the fact that the parallel sheets of air are of substantially equal volume and flow in a horizontal direction.

WILLIAM LOVING.

REFERENCES CITED

The following references are of record in the file of this patent:

UNITED STATES PATENTS

| Number | Name | Date |
| --- | --- | --- |
| 1,438,542 | Matlock | Dec. 12, 1922 |
| 2,163,630 | Reed | June 27, 1939 |
| 2,238,576 | Heller et al. | Apr. 15, 1941 |
| 2,368,828 | Hanson et al. | Feb. 6, 1945 |
| 2,375,797 | Krejci | May 15, 1945 |
| 2,378,055 | Wiegand et al. | June 12, 1945 |